United States Patent
Ootorii

(10) Patent No.: US 9,383,530 B2
(45) Date of Patent: Jul. 5, 2016

(54) CONNECTOR, METHOD OF MANUFACTURING SAME, AND OPTICAL COMMUNICATION SYSTEM

(71) Applicant: Sony Corporation, Tokyo (JP)

(72) Inventor: Hiizu Ootorii, Kanagawa (JP)

(73) Assignee: Sony Corporation, Tokyo (JP)

( * ) Notice: Subject to any disclaimer, the term of this patent is extended or adjusted under 35 U.S.C. 154(b) by 28 days.

(21) Appl. No.: 14/011,240

(22) Filed: Aug. 27, 2013

(65) Prior Publication Data

US 2014/0064662 A1 Mar. 6, 2014

(30) Foreign Application Priority Data

Sep. 4, 2012 (JP) ................... 2012-194258

(51) Int. Cl.
| | |
|---|---|
| *G02B 6/26* | (2006.01) |
| *G02B 6/42* | (2006.01) |
| *G02B 6/32* | (2006.01) |
| *G02B 6/38* | (2006.01) |

(52) U.S. Cl.
CPC ........ *G02B 6/424* (2013.01); *G02B 6/26* (2013.01); *G02B 6/4214* (2013.01); *G02B 6/32* (2013.01); *G02B 6/3861* (2013.01); *G02B 6/4239* (2013.01); *Y10T 29/49826* (2015.01)

(58) Field of Classification Search
CPC .......... G02B 6/4214; G02B 6/26; G02B 6/30; G02B 6/3616; G02B 6/3628; G02B 6/424
USPC ................... 385/33, 49, 52, 88–94
See application file for complete search history.

(56) References Cited

U.S. PATENT DOCUMENTS

| | | | | |
|---|---|---|---|---|
| 6,722,793 B2* | 4/2004 | Althaus et al. | | 385/92 |
| 6,901,185 B2* | 5/2005 | Sasaki et al. | | 385/33 |
| 7,543,994 B2* | 6/2009 | McColloch | | 385/89 |
| 8,100,589 B2* | 1/2012 | Okubo et al. | | 385/89 |
| 8,235,603 B2* | 8/2012 | Tamura et al. | | 385/88 |
| 8,494,321 B2* | 7/2013 | Herden et al. | | 385/49 |
| 8,909,010 B2* | 12/2014 | Kimura et al. | | 385/49 |
| 8,985,865 B2* | 3/2015 | Howard et al. | | 385/79 |
| 8,989,539 B2* | 3/2015 | Selli et al. | | 385/39 |
| 2006/0210225 A1* | 9/2006 | Fujiwara | | G02B 6/4214 385/92 |

FOREIGN PATENT DOCUMENTS

JP 2007-249194 9/2007

* cited by examiner

*Primary Examiner* — Daniel Petkovsek
(74) *Attorney, Agent, or Firm* — Chip Law Group

(57) ABSTRACT

A connector includes: a fiber attachment path in which at least a part thereof has a height less than an outer diameter of an optical fiber; and a light-direction changing section provided at an end of the fiber attachment path.

18 Claims, 16 Drawing Sheets

CONNECTOR, METHOD OF MANUFACTURING SAME, AND OPTICAL COMMUNICATION SYSTEM

BACKGROUND

The technology relates to a connector to which an optical fiber is to be attached, and a method of manufacturing the connector, as well as an optical communication system.

When transmission of optical signals is performed, a connector connecting a receiving section and a transmission section is used. In many cases, such a connector is configured of a component in which a supporting member (a ferrule) is attached to each of both ends of an optical fiber, and high positional accuracy is necessary for the attachment of the supporting member to this optical fiber. The optical fiber has a core wire covered by an overlayer made of resin or the like, and the optical fiber may have an outer diameter of, for example, about 250 μm, including the overlayer.

When the optical fiber is attached to the supporting member, since rigidity of the overlayer is low and the shape is resistant to fixing, the core wire is fixed to the supporting member, after the core wire is exposed by partially removing the overlayer (for example, see Japanese Unexamined Patent Application Publication No. 2007-249194). For example, after removing the overlayer by about 10 mm from an end of the optical fiber, the core wire of the optical fiber may be placed and fixed in a V-groove of the supporting member. The core wire of the optical fiber may have a diameter of, for example, about 80 μm or about 125 μm.

SUMMARY

However, the core wire of the optical fiber is thin and fragile. Therefore, fixing the core wire to the supporting member with high positional accuracy is very delicate work. In other words, it is difficult to automate a process of assembling the supporting member and the optical fiber, and this process greatly affects the cost.

It is desirable to provide a connector to which an optical fiber is more easily attachable, and a method of manufacturing the connector, as well as an optical communication system.

According to an embodiment of the technology, there is provided a connector including: a fiber attachment path in which at least a part thereof has a height less than an outer diameter of an optical fiber; and a light-direction changing section provided at an end of the fiber attachment path.

According to an embodiment of the technology, there is provided an optical communication system, including a connector performing optical communication between a receiving section and a transmission section, the connector including: a fiber attachment path in which at least a part thereof has a height less than an outer diameter of an optical fiber; and a light-direction changing section provided at an end of the fiber attachment path.

In the connector and the optical communication system according to the above-described embodiments of the technology, at least the part of the fiber attachment path has the height less than the outer diameter of the optical fiber. Therefore, the optical fiber having an overlayer is fixed to the fiber attachment path, in a state of maintaining high positional accuracy.

According to an embodiment of the technology, there is provided a method of manufacturing a connector, the method including: placing an optical fiber in a depression section of a supporting member having the depression section on a surface; and covering, with a cover member, the depression section in which the optical fiber is placed, and fixing the optical fiber in the fiber attachment path configured using the depression section and the cover member, after flattening the optical fiber.

In the method of manufacturing the connector according to the above-described embodiment of the technology, the optical fiber is flattened. In other words, the optical fiber is pressed by the cover member. Therefore, the optical fiber having an overlayer is fixed to the depression section of the supporting member, in a state of maintaining high positional accuracy.

According to the connector, the method of manufacturing the connector, and the optical communication system of the above-described embodiments of the technology, the optical fiber is attached without removing the overlayer. Thus, assembly is performed more easily. Therefore, automation of assembly work and a reduction in manufacturing cost are allowed.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to describe the principles of the technology.

FIG. 21 is a block diagram illustrating an outline of an optical communication system including the connector illustrated in FIG. 1 and the like.

DETAILED DESCRIPTION

Figure 1:
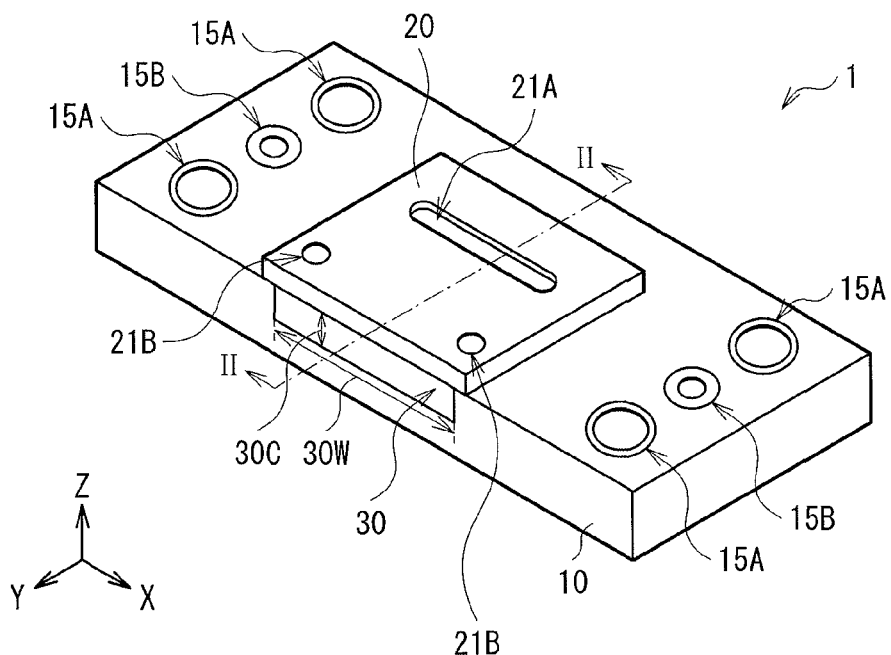
FIG. 1 is a perspective diagram illustrating a configuration of a main part of a connector according to a first embodiment of the technology.

Embodiments of the technology will be described below in detail with reference to the drawings. It is to be noted that the description will be provided in the following order.

1. First Embodiment
A connector: an example in which a height of a fiber attachment path is less than an outer diameter of an optical fiber
2. Modification 1
An example of having a moisture-proof film at an open end of a fiber attachment path
3. Modification 2
An example of having a plurality of projections and depressions on an overlayer of an optical fiber
4. Second Embodiment
A connector: an example in which a cover member includes a holding section
5. Modification 3
An example in which a swelling adhesive is provided in a holding section
6. Application Example
An optical communication system

First Embodiment

Figure 2:
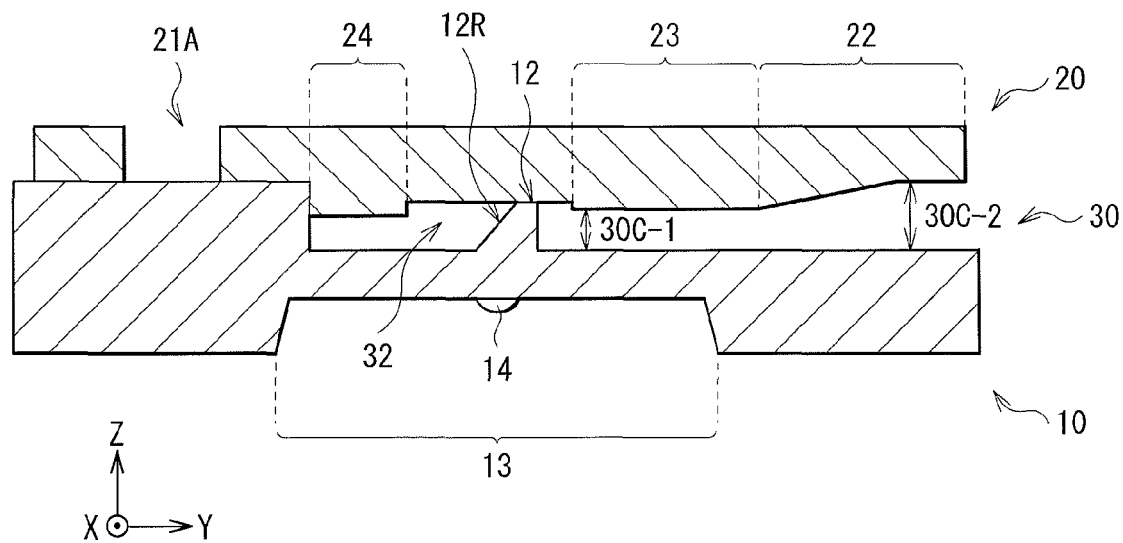
FIG. 2 is a diagram illustrating a cross-sectional configuration taken along a line II-II illustrated in FIG. 1.

FIG. 1 illustrates a configuration of a main part of a connector 1 according to a first embodiment of the technology. FIG. 2 illustrates a cross-sectional configuration taken along a line II-II in FIG. 1. In FIG. 1 and FIG. 2, illustration of an optical fiber (an optical fiber 40 in FIG. 10, which will be described later) is omitted. The connector 1 may be, for example, a connector that fixes end parts of a plurality of optical fibers to a fiber attachment path 30 configured using a supporting member 10 and a cover member 20. The fiber attachment path 30 has a height 30C (in a Z direction) and a width 30W (in an X direction), and extends in a predetermined length (in a Y direction). One end of the fiber attachment path 30 is open (an open end), and the other end is closed by contact between the supporting member 10 and the cover member 20 (an inner end). In the fiber attachment path 30, for example, twelve optical fibers may be disposed side by side in a width direction thereof, while extending in a longitudinal direction thereof.

Figure 3:
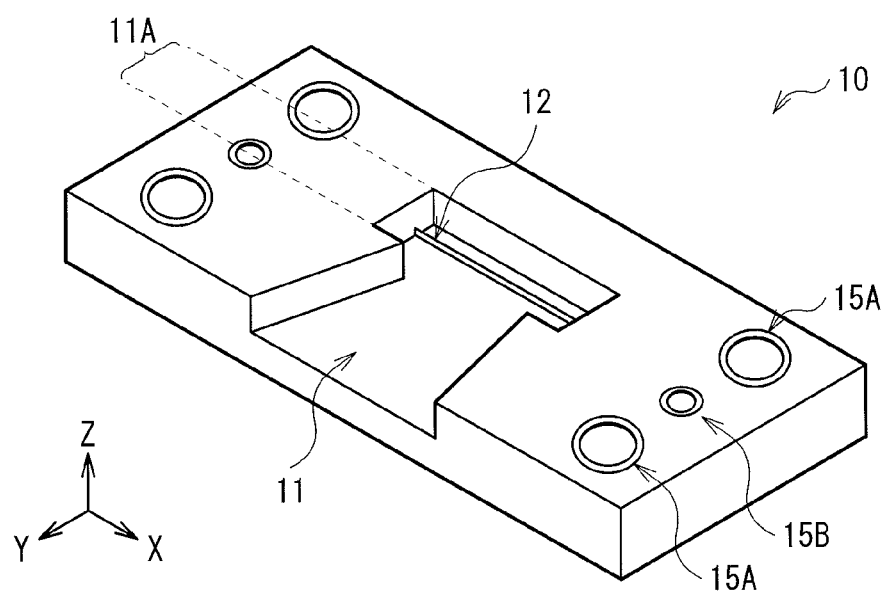
FIG. 3 is a perspective diagram illustrating a configuration of a supporting member illustrated in FIG. 1.
Figure 4A:
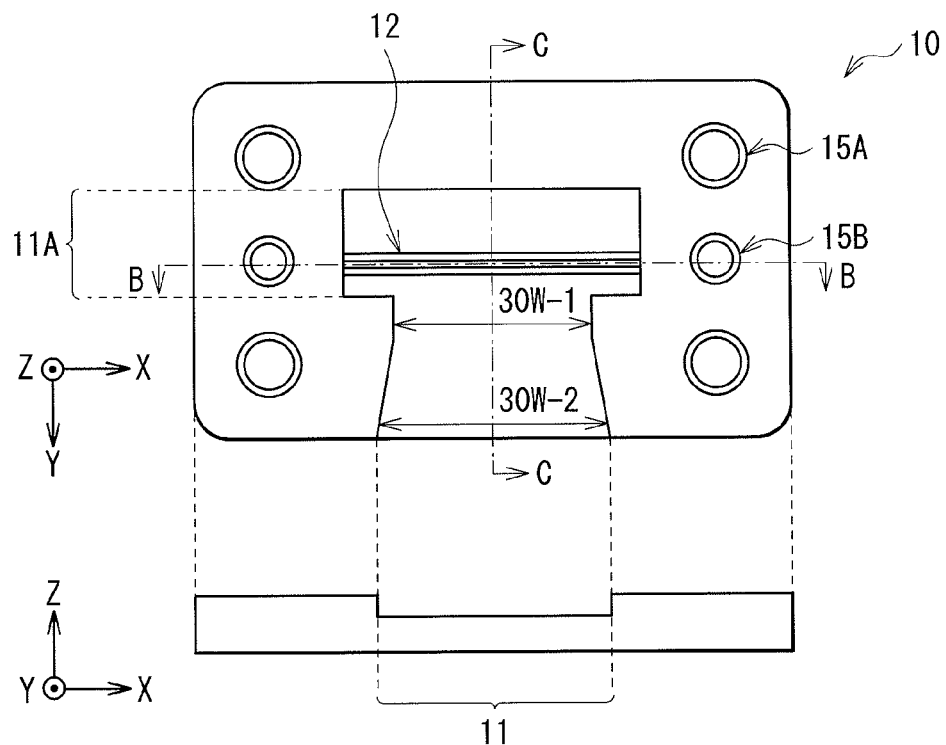
FIG. 4A is a diagram illustrating a top view and a side view of the supporting member illustrated in FIG. 3.
Figure 4B:
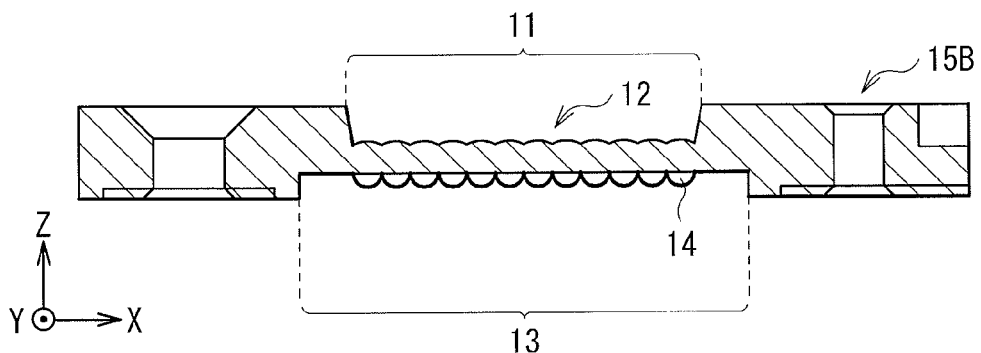
FIG. 4B is a cross-sectional diagram taken along a line B-B illustrated in FIG. 4A.
Figure 4C:
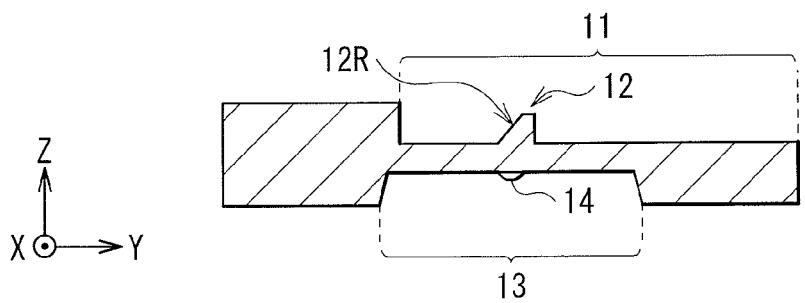
FIG. 4C is a cross-sectional diagram taken along a line C-C illustrated in FIG. 4A.
Figure 5:
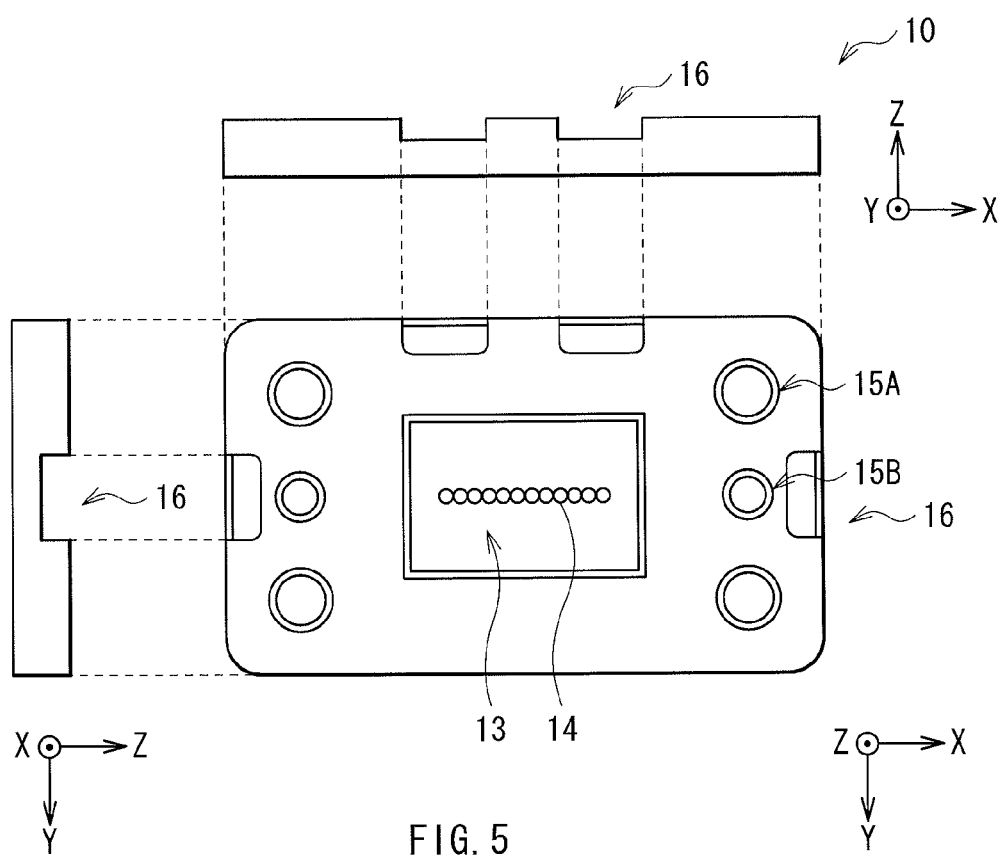
FIG. 5 is a diagram illustrating a bottom view and side views of the supporting member illustrated in FIG. 2.

As illustrated in FIG. 3, the supporting member 10 may be, for example, a substantially rectangular solid of about 2 mm to about 10 mm long, about 5 mm to about 20 mm wide, and about 0.5 mm to about 2.0 mm high, and have a surface provided with a depression section 11. FIG. 4A illustrates the surface and a side face of the supporting member 10, FIG. 4B illustrates a cross-sectional configuration taken along a line B-B in FIG. 4A, and FIG. 4C illustrates a cross-sectional configuration taken along a line C-C in FIG. 4A. FIG. 5 illustrates a configuration of each of a back surface and side faces of the supporting member 10.

Figure 6:
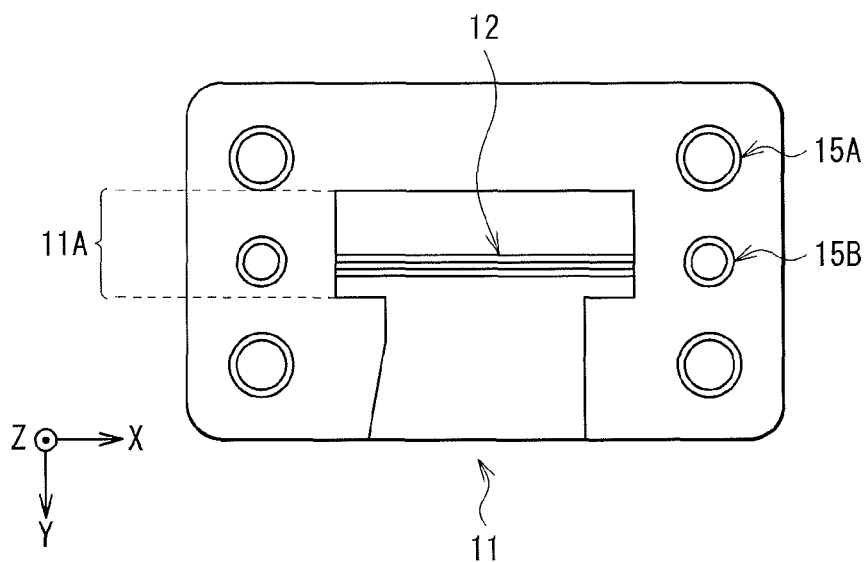
FIG. 6 is a plan view illustrating another example of the supporting member illustrated in FIG. 4A.

The depression section 11 has an opening in the side face of the supporting member 10, and a protruding section 12 is provided in the depression section 11. The fiber attachment path 30, which has the one end being open and the other end being closed by the protruding section 12 and the cover member 20, is formed by covering the depression section 11 with the cover member 20. The width 30W of the fiber attachment path 30 is equal to a width of the depression section 11, and, for example, may become gradually narrow (in the Y direction) from a width 30W-2 at the open end to the protruding section 12 on a rear side (FIG. 4A). Two sides of the depression section 11 defining the width 30W may be formed to become closer to each other (FIG. 4A), or only one of these two sides may be formed to become closer to the other as illustrated in FIG. 6. A minimum width 30W-1 of the fiber attachment path 30 may be, preferably, substantially equal to the sum of outer diameters (represented by an outer diameter 40D in FIG. 10, which will be described later) of the respective plurality of optical fibers contained in the fiber attachment path 30. Here, "being substantially equal" may include, for example, manufacturing errors of about 1% to about 2%. When twelve optical fibers each having an outside diameter of about 250 μm is fixed to the fiber attachment path 30, the width 30W-1 may be preferably about 2.96 mm to about 3.04 mm. In this case, the width 30W-2 may be, for example, about 3.2 mm Equating the width 30W-1 of the fiber attachment path 30 with the sum of the outer diameters of the respective plurality of optical fibers allows positional accuracy of the optical fiber to be enhanced. In addition, gradually narrowing the width from the width 30W-2 to the width 30W-1 makes it possible to prevent a force from being locally exerted on the optical fibers.

The depression section 11 has a wide section 11A having a width larger than the width 30W-1, on a side more rearward than a position of the width 30W-1 (i.e. on a side opposite to a position of the width 30W-2). The wide section 11A may be, for example, used when the optical fiber 40 is fixed. The width of the wide section 11A may be about 4.4 mm, when the width 30W-1 is about 2.96 mm.

Figure 11:
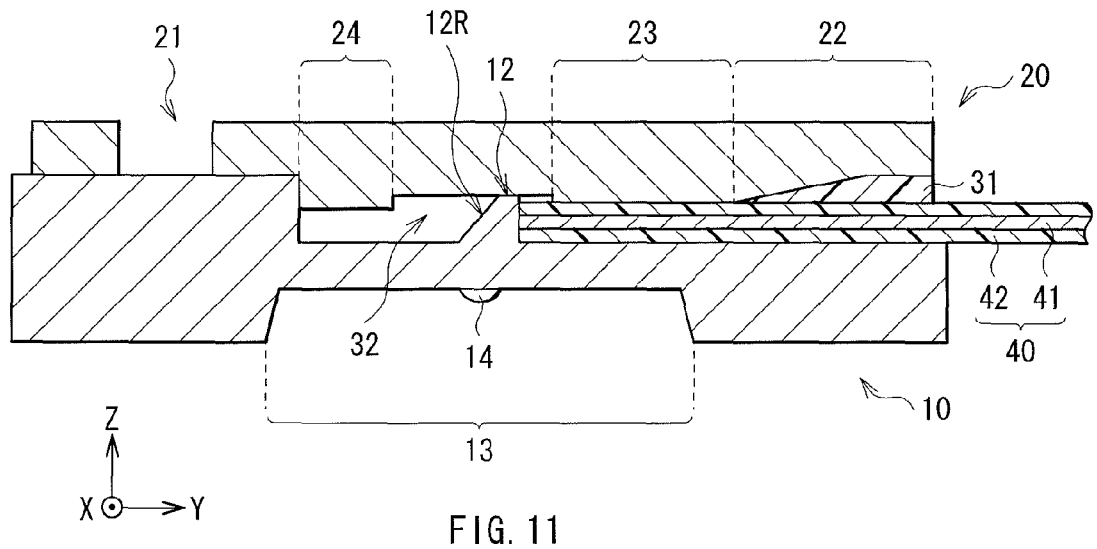
FIG. 11 is a cross-sectional diagram illustrating a configuration of an optical fiber fixed to the fiber attachment path illustrated in FIG. 1.

The protruding section 12 may be provided, for example, in the wide section 11A. The protruding section 12 may be provided in proximity to the position of the width 30W-1 that is the minimum width, and may be preferably, for example, at a position of about 0.4 mm away therefrom. Alternatively, the protruding section 12 may be provided at the position of the width 30W-1. The protruding section 12 may have a height (in the Z direction) of, for example, about 0.15 mm to about 0.50 mm. For example, the protruding section 12 may be provided as each of a plurality of protruding sections corresponding to the number of the optical fibers, and each of the optical fibers may be fixed in contact with one surface (on the open end side) of the protruding section 12 (FIG. 11 described later). The other surface of the protruding section 12 may be, for example, inclined at a predetermined angle, toward the surface of the supporting member 10 (i.e. a bottom face of the depression section 11), and serves as a reflection section 12R (a light-direction changing section) that changes a direction of incident light (FIG. 4C). For example, the reflection section 12R may be inclined at about 45 degrees toward the surface of the supporting member 10, and changes the direction of the incident light by about 90 degrees. Providing the reflection section 12R makes it possible to slim down the connector 1. The optical fiber is optically connected to the reflection section 12R at an end of the fiber attachment path 30. Thus, when light enters the reflection section 12R from the optical fiber side, the light exits to the back-surface side of the supporting member 10, and when light enters the reflection section 12R from the back-surface side of the supporting member 10, the light exits in an extending direction of the optical fiber. For example, an inexpensive total reflection mirror may be used for the reflection section 12R. The reflection section 12R may be configured by depositing a metal film made of metal such as aluminum, or may be configured by attaching a mirror component to the protruding section 12.

On the back surface of the supporting member 10, a lens 14 is provided at a position facing each of the protruding sections 12. The lens 14 may be, for example, a collimate lens, and used to convert light outputted from the optical fiber into parallel light, or condense light entering from the back surface of the supporting member 10 to an end of the optical fiber. For example, the lens 14 may be provided in a depression section 13 on the back-surface side of the supporting member 10, to prevent damage due to shock and the like. A plastic mold micro-lens, for example, may be used for the lens 14. At an end of the supporting member 10, for example, a fixing hole 15A and a fixing hole 15B may be provided. The fixing hole 15A is used to fix the connector 1 to a substrate such as a motherboard, and the fixing hole 15B is used to align and fix associated components. A depression section 16 may be provided on the circumference of the back surface of the supporting member 10, and used, for example, to fix a cover that covers the connector 1. The supporting member 10 may be made of, for example, resin such as PPS (polyphenylene sulfide) or metal such as aluminum (Al) and stainless steel (SUS). The resin may contain a filler (fine particles).

Figure 7:
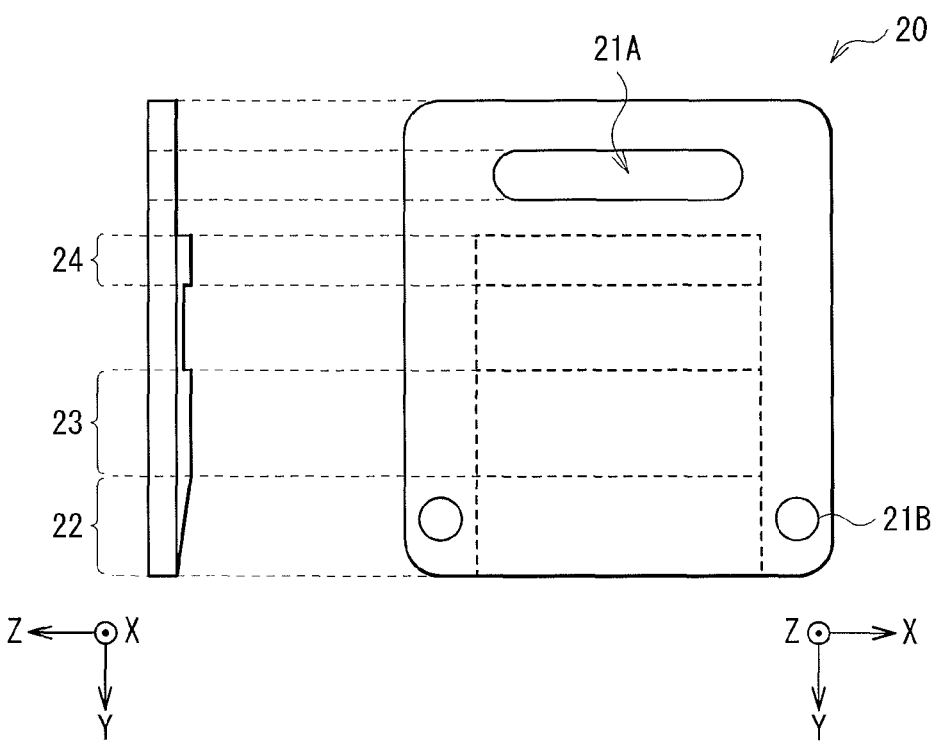
FIG. 7 is a diagram illustrating a top view and a side view of a cover member illustrated in FIG. 1.

As illustrated in FIG. 7, the cover member 20 shaped like a plate may be, for example, a rectangle or a square having each long side of about 2 mm to about 20 mm, and each short side of about 2 mm to about 10 mm. For example, one of the short sides of the cover member 20 may overlap the opening of the depression section 11 (FIG. 1). In other words, the fiber attachment path 30 extends in a long-side direction of the cover member 20. The cover member shaped like a quadrangle may have rounded corners. In the cover member 20, a tapered section 22, a positioning section 23, and a locking section 24 are provided in this order from the open end toward the rear side of the fiber attachment path 30 (FIG. 2 and FIG. 7). The tapered section 22 has a thickness (in the Z direction) gradually increasing toward the positioning section 23. The positioning section 23 is provided next to the above-described tapered section 22, and may have, for example, a uniform thickness achieved by maintaining a maximum thickness of the tapered section 22. The locking section 24 may protrude, for example, by about 0.2 mm from the surface of the cover member 20, to perform alignment between the supporting member 10 and the cover member 20, by being engaged with an edge of the depression section 11 (FIG. 2). The protruding section 12 of the supporting member 10 is in contact with a part between the positioning section 23 and the locking section 24. It is not necessary for the protruding section 12 to be completely in contact with the cover member 20, and may be, for example, in proximity thereto by about 0.1 mm away. The protruding section 12 may be preferably in contact with or in proximity to the cover member 20, at a position close to the positioning section 23, and may be preferably, for example, in contact with the cover member 20 at a position about 0.2 mm away from the positioning section 23.

At an end of the cover member 20, an oval injection hole 21A and a circular injection hole 21B are provided. The injection holes 21A and 21B pass through the cover member 20, and are provided at respective points in the cover member 20 excluding a part forming the fiber attachment path 30. Through the injection holes 21A and 21B, an adhesive (not illustrated) is injected when the supporting member 10 and the cover member 20 are fixed. The injection holes 21A and 21B may be in any shape, and the number thereof is not limited either.

Figure 8:
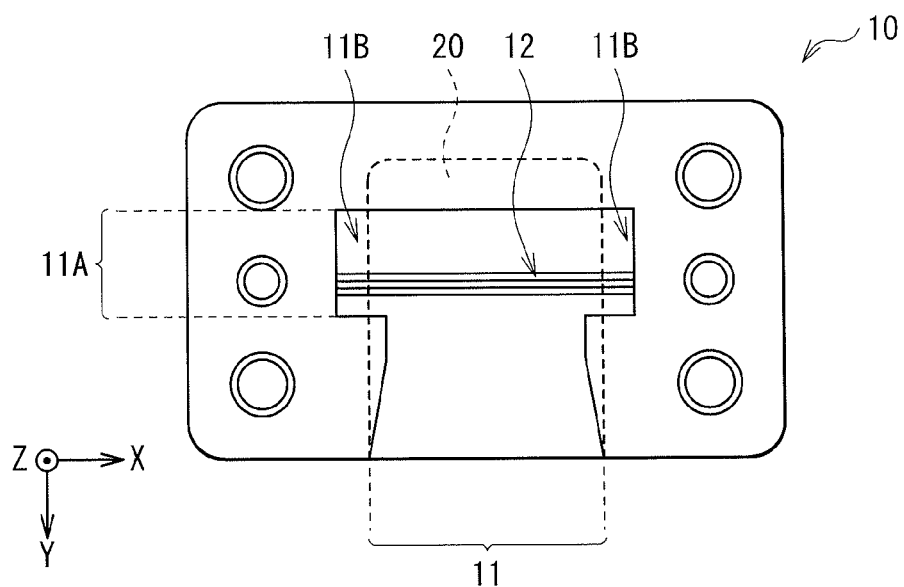
FIG. 8 is a diagram used to describe an injection section for an adhesive used to fix an optical fiber to a fiber attachment path illustrated in FIG. 1.
Figure 9:
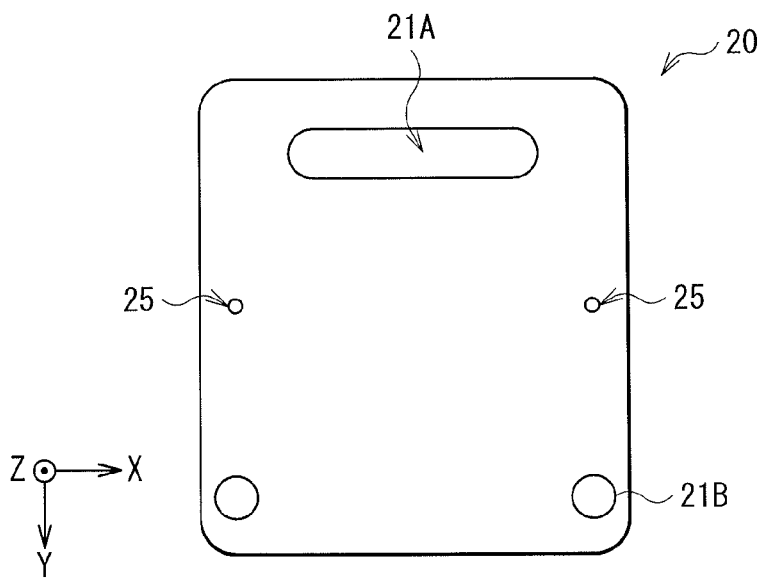
FIG. 9 is a plan view illustrating another example of the injection section illustrated in FIG. 8.

As illustrated in FIG. 8, the short sides of the cover member 20 are shorter than the width of the wide section 11A, and the wide section 11A is exposed from the cover member 20 (an injection section 11B). Through the injection section 11B, an adhesive (an adhesive 31 in FIG. 11, which will be described later) used to fix the optical fibers to the fiber attachment path 30 is injected. Instead of the injection section 11B, injection holes 25 may be provided in the cover member 20 (FIG. 9). The adhesive may be injected from the open end side of the fiber attachment path 30, but preferably, the adhesive may be injected from a position close to the protruding section 12.

A material similar to that of the supporting member 10 may be used for the cover member 20. When a photocurable resin is used for the adhesive provided to fix the optical fibers, a light transmissive material may be preferably used for at least a part of a portion forming the fiber attachment path 30, the portion belonging to the supporting member 10 and the cover member 20. For example, when a UV-curable resin is used as the adhesive, a material capable of ultraviolet irradiation (a UV light transmission material) may be used. In order to ensure safety, for example, a material that does not allow signal wavelengths of light such as infrared light to pass therethrough may be used for each of the supporting member 10 and the cover member 20.

Figure 10:
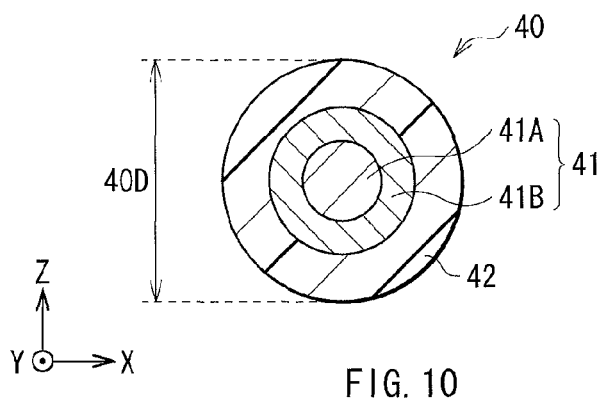
FIG. 10 is a cross-sectional diagram illustrating an example of an optical fiber to be attached to the fiber attachment path illustrated in FIG. 1.

As illustrated in FIG. 10, the optical fiber 40 having a circular cross-section (a section X-Z) may include, for example, a core wire 41 made of quartz glass, in a central part. The core wire 41 includes a core 41A at the center, and a clad 41B provided therearound. The core 41A has a refractive index greater than that of the clad 41B. In the optical fiber 40, the core wire 41 (the clad 41B) may be covered with, for example, an overlayer 42 made of resin. The overlayer 42 is used to reinforce the core wire 41, and improve a mechanical characteristic of the optical fiber 40. When a photocurable resin is used for the adhesive provided to fix the optical fiber 40, a light transmissive material may be preferably used for the resin of the overlayer 42. For example, when a UV-curable resin is used as the adhesive, curing unevenness is allowed to be prevented by forming the overlayer 42 with a resin material capable of allowing UV light to pass therethrough. For example, the core 41A may have a diameter of about 50 μm, the clad 41B (the core wire 41) may have a diameter of about 80 μm or about 125 μm, and the optical fiber 40 may have, for example, the diameter 40D of about 250 μm including the overlayer 42. The plurality of (e.g. twelve) optical fibers 40 are allowed to be aligned with and fixed to the fiber attachment path 30 at a time, which allows a reduction in manufacturing cost.

In the fiber attachment path 30, as illustrated in FIG. 11, for example, the optical fiber 40 may be fixed by the adhesive 31 (a first adhesive) made of a photocurable resin, and extend from the open end to the outside of the fiber attachment path 30. For example, EPI-TEK 353ND (registered trademark, available from Epoxy Technology, Inc., located in MA, United Sates) may be used for the adhesive 31. Both ends of the optical fiber 40 may be attached to the fiber attachment path 30, or only one of these ends may be attached thereto. In the present embodiment, the fiber attachment path 30 has the height 30C-1 less than the outer diameter 40D of the optical fiber 40 (FIG. 2). Thus, the optical fiber 40 is fixed to the fiber attachment path 30, without removing the overlayer 42.

In the fiber attachment path 30, the tapered section 22 and the positioning section 23 of the cover member 20 face the depression section 11 of the supporting member 10 (FIG. 2). The height 30C of this fiber attachment path 30 is gradually reduced by the tapered section 22 from the open end (the height 30C-2) to the protruding section 12 on the rear side, and reaches the minimum height 30C-1 at the positioning section 23 of the cover member 20. For example, the height 30C-1 less than the outer diameter 40D of the optical fiber 40 may be about 70% or more of the outer diameter 40D, and when the outer diameter 40D is about 250 μm, the height 30C-1 may be about 175 μm or more and less than about 250 μm. Above all, the height 30C-1 may be preferably about 88% or more of the outer diameter 40D of the optical fiber 40, and when the outer diameter 40D is about 250 μm, the height 30C-1 may be preferably about 220 μm or more and less than about 250 μm. The height 30C-1 may be adjusted according to rigidity of the overlayer 42 of the optical fiber 40 and/or rigidity of the material of each of the supporting member 10 and the cover member 20.

Figure 12:
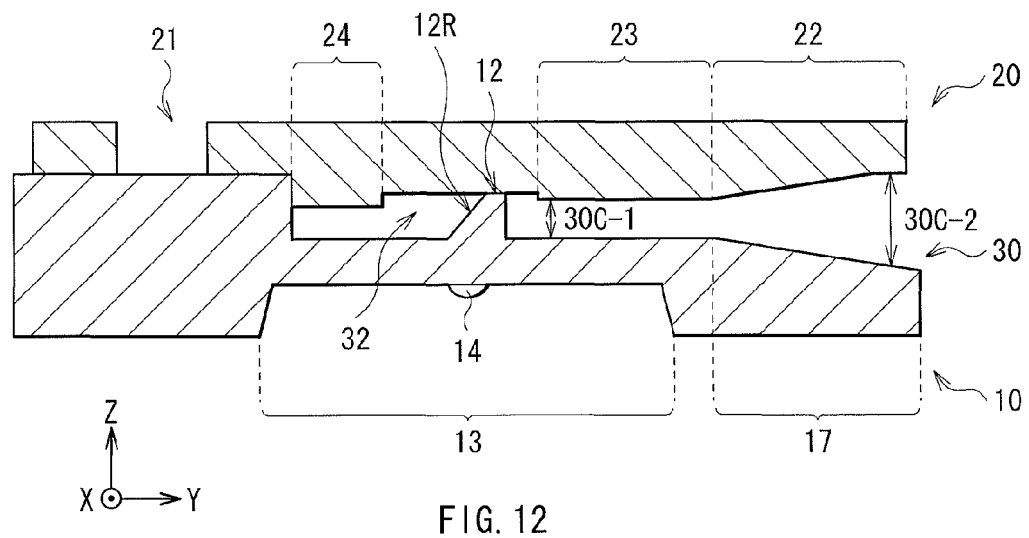
FIG. 12 is a cross-sectional diagram illustrating another example of the fiber attachment path illustrated in FIG. 11.
Figure 13:
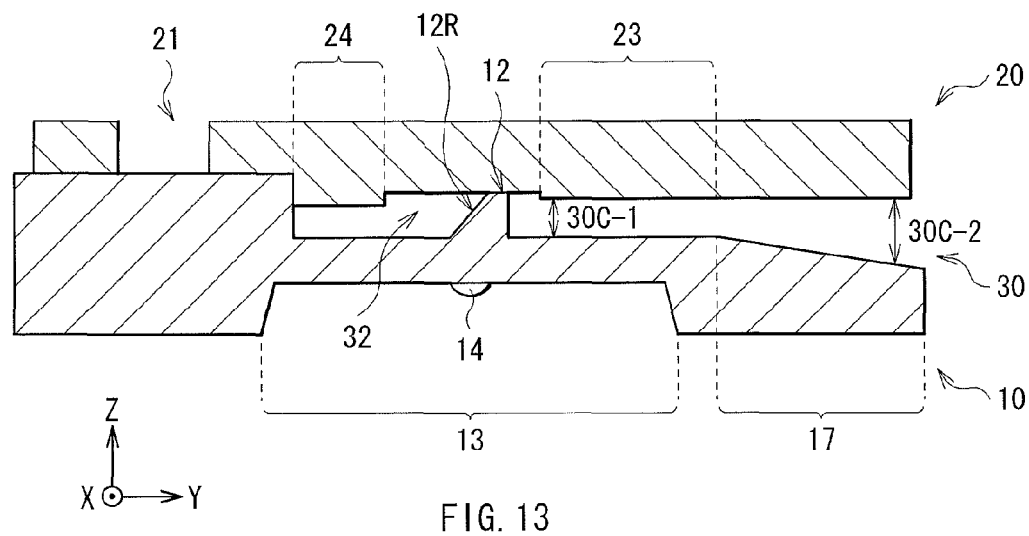
FIG. 13 is a cross-sectional diagram illustrating still another example of the fiber attachment path illustrated in FIG. 11.

The height 30C of the fiber attachment path 30 is gradually reduced by the tapered section 22 of the cover member 20, from the open end side toward the rear side. Thus, it is possible to prevent a force from being locally exerted on the optical fiber 40. As illustrated in FIG. 12, the supporting member 10 may also be provided with a tapered section 17 facing the tapered section 22 of the cover member 20, thereby changing the height 30C of the fiber attachment path 30. As illustrated in FIG. 13, it is also possible to prevent local application of a load to the optical fiber 40, by using only the tapered section 17 of the supporting member 10. The fiber attachment path 30 may have, for example, a length of about 1 mm to about 10 mm.

Figure 14:
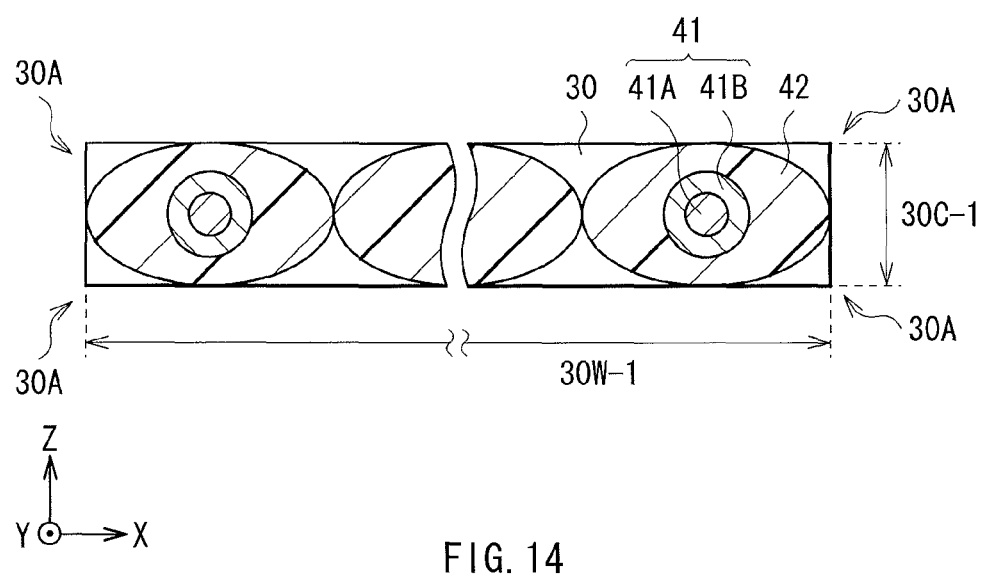
FIG. 14 is a cross-sectional diagram illustrating a configuration of an optical fiber at a position where a height of the fiber attachment path illustrated in FIG. 11 is minimum.

As illustrated in FIG. 14, in a part having the height 30C-1, the fiber attachment path 30 (the supporting member 10 and the cover member 20) presses the optical fiber 40, thereby flattening the optical fiber 40. By thus pressing the optical fiber 40 in a part of the extending direction of the fiber attachment path 30, it is possible to fix the optical fiber 40 with high positional accuracy even when the optical fiber 40 has the overlayer 42 that is less rigid than the core wire 41. The section (X-Z) of the fiber attachment path 30 may be, for example, a quadrangle such as a rectangle, and provided with two corner sections 30A respectively facing the optical fibers 40 at both ends, among the plurality of optical fibers 40 arranged side by side. In other words, the fiber attachment path 30 has a part (the corner section 30A) whose curvature is smaller than that of the optical fiber 40, the part being at a position facing the optical fiber 40 at each of both ends. By providing the corner section 30A as described above, pressures are applied uniformly to the plurality of optical fibers 40 from top, bottom, right, and left, which makes it possible to control positions and array pitches precisely.

Between the supporting member 10 and the cover member 20, a sealing section 32 is provided in addition to the fiber attachment path 30 (FIG. 11). The sealing section 32 is an enclosed space formed when the cover member 20 contacts the protruding section 12 and an edge of the depression section 11 of the supporting member 10. The sealing section 32 is provided with the reflection section 12R. Providing the reflection section 12R in the sealing section 32 that is the enclosed space makes it possible to prevent foreign matters and water droplets from attaching to the reflection section 12R. Further, the protruding section 12 having a predetermined height stops the adhesive 31 flowing into the sealing section 32, and prevents the reflection section 12R from being contaminated by the adhesive 31. In other words, it is possible to keep the reflection section 12R clean, by providing the protruding section 12 in the depression section 11.

The connector 1 as described above may be manufactured as follows, for example. First, the ends of the respective optical fibers 40 that may be twelve, for example, are placed in the depression section 11 of the supporting member 10. Next, the cover member 20 is placed on the depression section 11, and then fixed to the supporting member 10 while the optical fiber 40 is pressed. At this moment, the optical fibers 40 are flattened by the fiber attachment path 30 configured using the cover member 20 and the supporting member 10. The adhesive used to fix the cover member 20 and the supporting member 10 is injected into the injection holes 21A and 21B of the cover member 20, and then may be cured by, for example, UV irradiation. The fiber attachment path 30 is filled with the adhesive 31 injected through the injection section 11B (FIG. 8) or the injection holes 25 (FIG. 9), and then, the adhesive 31 may be cured by, for example, UV irradiation, to fix the optical fibers 40. By going through the above-described process, the connector 1 is completed. Configuring the connector 1 by using the two members (the supporting member 10 and the cover member 20) makes it possible to control the shape of the fiber attachment path 30 easily.

In the connector 1, the light entering into the lens 14 from the back-surface side of the supporting member 10 is condensed and enters the reflection section 12R. The direction of this light is changed by the reflection section 12R, and then, the light enters into the end of the optical fiber 40 and is transmitted. Meanwhile, as for the light entering into the reflection section 12R after being transmitted by the optical fiber 40 enters the lens 14 after the direction thereof is changed by the reflection section 12R. This light is converted into the parallel light by the lens 14, and then exits on the back-surface side of the supporting member 10. Here, the fiber attachment path 30 has the height 30C-1 less than the outer diameter 40D of the optical fiber 40, and thus it is possible to attach the optical fiber 40 without removing the overlayer 42. This will be described below in detail.

Figure 15A:
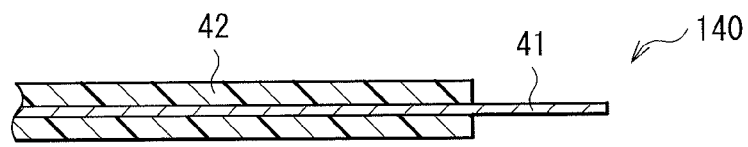
FIG. 15A is a cross-sectional diagram illustrating a process of manufacturing a connector according to a comparative example.
Figure 15B:
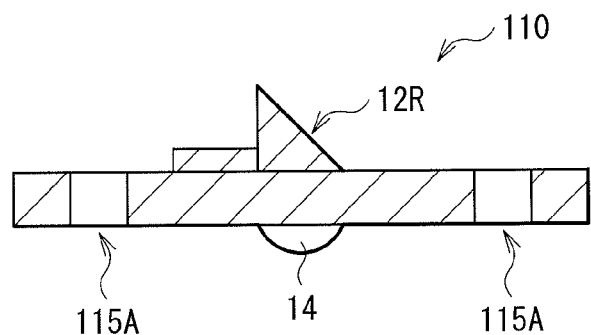
FIG. 15B is a cross-sectional diagram illustrating a process following that illustrated in FIG. 15A.
Figure 15C:
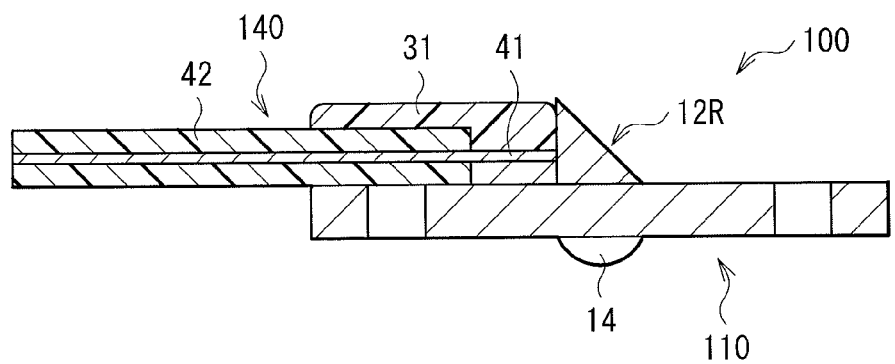
FIG. 15C is a cross-sectional diagram illustrating a process following that illustrated in FIG. 15B.

FIGS. 15A to 15C illustrate a manufacturing process of a connector 100 according to a comparative example. First, an overlayer 42 of an optical fiber 140 is partially removed to expose a core wire 41 (FIG. 15A). Positional accuracy of the optical fiber 140 may be otherwise reduced, since rigidity of the overlayer 42 is lower than that of the core wire 41. Next, the exposed core wire 41 is placed on a supporting member 110 (FIG. 15B) having a reflection section 12R, and the exposed core wire 41 is fixed by an adhesive 31 (FIG. 15C). In the above-described manufacturing process of the connector 100, work of fixing the core wire 41 that is thin and fragile to the supporting member 110 is very delicate, and thus is difficult to be automated. In other words, it is difficult to suppress manufacturing costs of the connector 100.

In contrast, in the connector 1 of the present embodiment, the height 30C of the fiber attachment path 30 is less than the outer diameter 40D of the optical fiber 40 including the overlayer 42 (i.e. the height 30C-1), at a part (the positioning section 23 of the cover member 20) in the extending direction. Thus, even when the optical fiber 40 is fixed to the fiber attachment path 30 without removing the overlayer 42, high positional accuracy is maintained. Therefore, assembly work for the supporting member 10, the cover member 20, and the optical fiber 40 is simple.

As described above, in the present embodiment, the fiber attachment path 30 has the height 30C-1 that is less than the outer diameter 40D of the optical fiber 40, and thus, the assembly work is allowed to be performed easily. Therefore, a reduction in cost is allowed by improvement such as automation of the work.

In addition, the fiber attachment path 30 has the width 30W-1 that is equal to the sum of the outer diameters 40D of the respective plurality of optical fibers 40. Therefore, the optical fiber 40 is allowed to be fixed to the fiber attachment path 30 with high positional accuracy. Moreover, to the fiber attachment path 30, the plurality of optical fibers 40 are allowed to be fixed.

In addition, the connector 1 is allowed to be thin, since the reflection section 12R is provided.

Modifications and another embodiment of the technology will be described below. Elements common to those of the first embodiment will be provided with the same reference numerals as those of the first embodiment and thus, the description thereof will be omitted.

Modification 1

Figure 16:
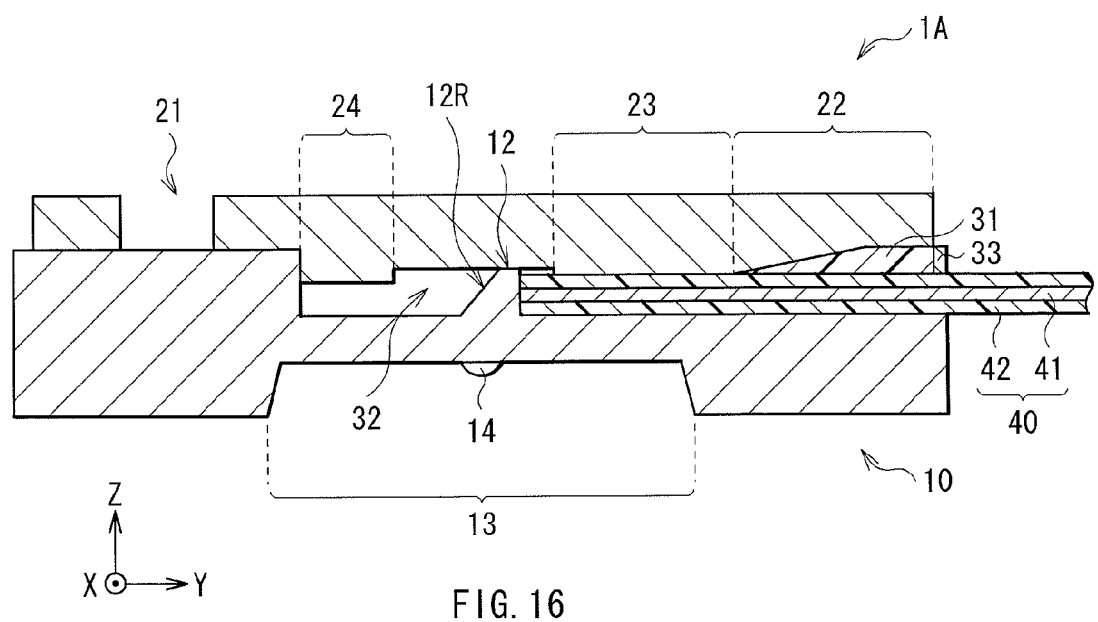
FIG. 16 is a cross-sectional diagram illustrating a configuration of a connector according to a modification 1.

FIG. 16 illustrates a cross-sectional configuration of a connector 1A according to a modification 1 of the first embodiment. In the connector 1A, an open end of the fiber attachment path 30 is covered by a moisture-proof film 33. Otherwise, the connector 1A is similar to the connector 1 in terms of configuration, and also has similar functions and effects.

The moisture-proof film 33 is provided at the open end of the fiber attachment path 30, specifically, on a surface of the adhesive 31, to prevent entrance of water into the fiber attachment path 30 (the optical fiber 40). The moisture-proof film 33 may be configured using, for example, a material based on SiN (silicon nitride). The moisture-proof film 33 as described above may be formed, for example, by a method such as sputtering. Together with or in place of the moisture-proof film 33, a moisture-proof film may be provided at the injection section 11B or the injection holes 25 and the like.

Modification 2

Figure 17A:
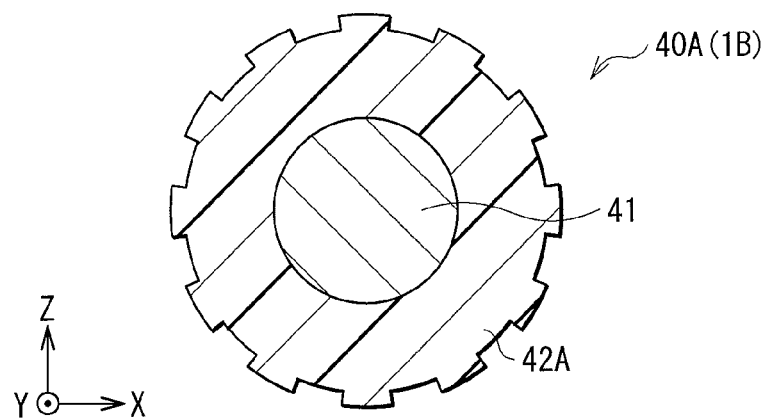
FIG. 17A is a cross-sectional diagram illustrating a configuration of a connector (an optical fiber) according to a modification 2.
Figure 17B:
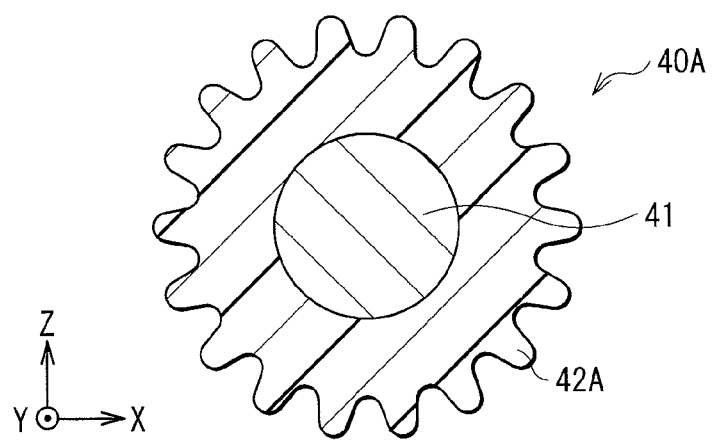
FIG. 17B is a cross-sectional diagram illustrating another example of the optical fiber illustrated in FIG. 17A.

A connector 1B according to a modification 2 of the first embodiment includes an optical fiber 40A illustrated in each of FIGS. 17A and 17B. In the optical fiber 40A, a surface of an overlayer 42A is provided with a plurality of projections and depressions. Otherwise, the connector 1B is similar to the connector 1 in terms of configuration, and also has similar functions and effects.

The projections and depressions of the overlayer 42A may be square (gear-shaped) (FIG. 17A), or may be bellows-shaped (FIG. 17B). By thus providing the projections and depressions in the overlayer 42, the adhesive 31 (FIG. 11) is spread out in the fiber attachment path 30 thoroughly, and the optical fiber 40A is firmly fixed by the fiber attachment path 30.

Second Embodiment

Figure 18:
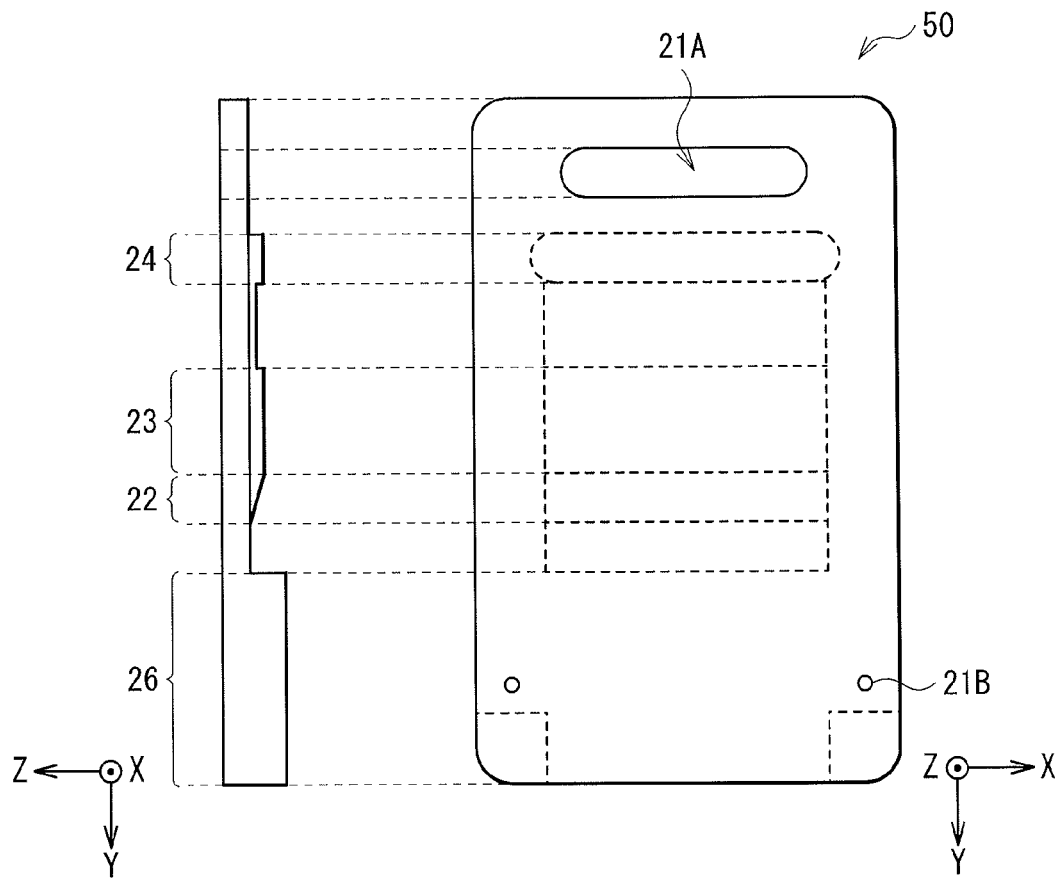
FIG. 18 is a diagram illustrating a top view and a side view illustrating a configuration of a connector (a cover member) according to a second embodiment of the technology.

FIG. 18 illustrates a configuration of each of a plane and a side face of a cover member 50 of a connector (a connector 2 in FIG. 19, which will be described later) according to a second embodiment of the technology. The cover member 50 includes a holding section 26 that supports the optical fiber 40 (FIG. 11) extending to the outside of the fiber attachment path 30. Otherwise, the connector 2 is similar to the connector 1 in terms of configuration, and also has similar functions and effects.

Figure 19:
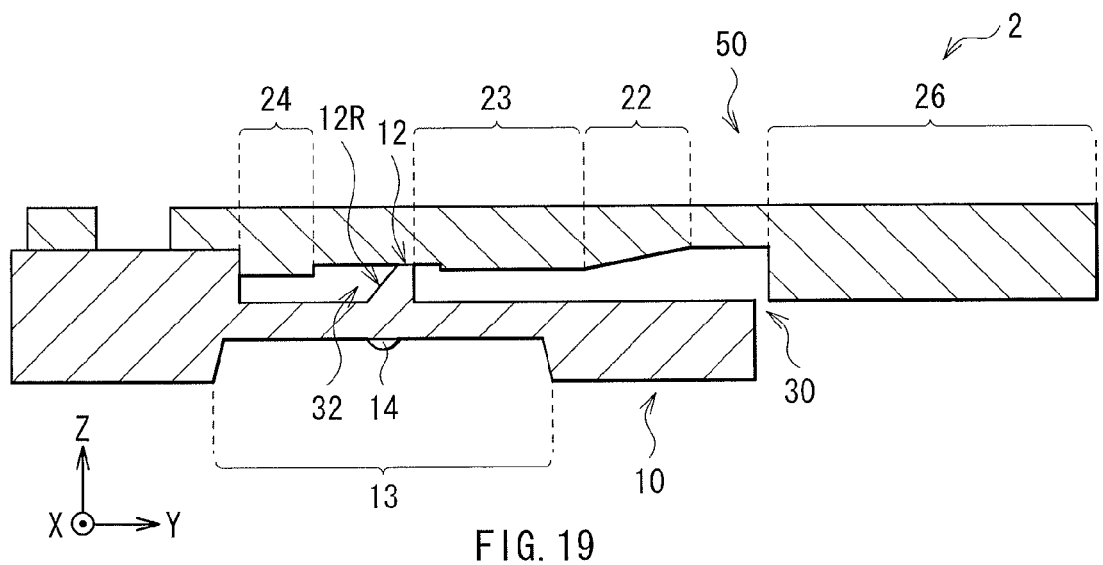
FIG. 19 is a cross-sectional diagram of the connector having the cover member illustrated in FIG. 18.

The cover member 50 includes the holding section 26, a tapered section 22, a positioning section 23, and a locking section 24 in this order. The holding section 26 protrudes further than the supporting member 10 (the fiber attachment path 30) (FIG. 19). Therefore, even in a thinned connector, the optical fiber is allowed to be fixed firmly by the holding section 26 of the cover member 50, together with the fiber attachment path 30. The holding section 26 may protrude to the outside of the supporting member 10, by about 2.3 mm, for example.

Modification 3

Figure 20:
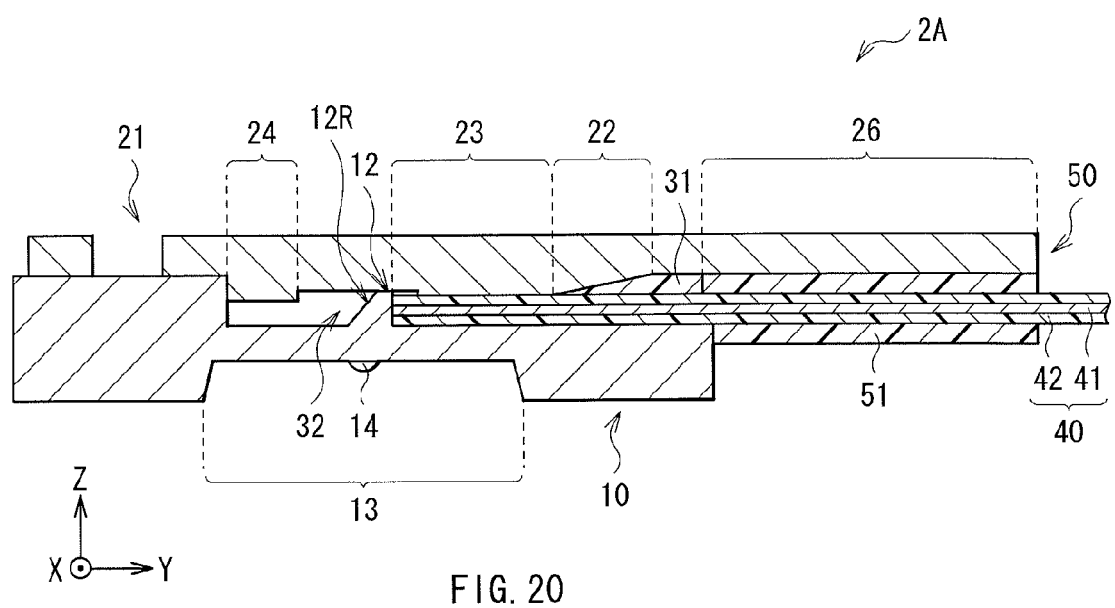
FIG. 20 is a cross-sectional diagram illustrating a configuration of a connector according to a modification 3.

FIG. 20 illustrates a cross-sectional configuration of a connector 2A according to a modification 3 of the second embodiment. In the connector 2A, the optical fiber 40 is fixed to the holding section 26 of the cover member 50, by a swelling adhesive 51 (a second adhesive). Otherwise, the connector 2A is similar to the connector 2 in terms of configuration, and also has similar functions and effects.

When the adhesive 31 used to fix the optical fiber 40 to the fiber attachment path 30 swells, a pressure may be applied to the optical fiber 40, and the core wire 41 of the optical fiber 40 may be separated from the protruding section 12. Here, when potting of the swelling adhesive 51 in the holding section 26 is performed, a force is exerted in a direction of pressing the core wire 41 against the protruding section 12, which makes it possible to prevent the optical fiber 40 from being removed. The material of the adhesive 31 may be used as a material of the adhesive 51.

Application Example

Using any of the above-described connectors 1, 1A, 1B, 2, and 2A, an optical communication system may be configured as follows, for example.

Figure 21:
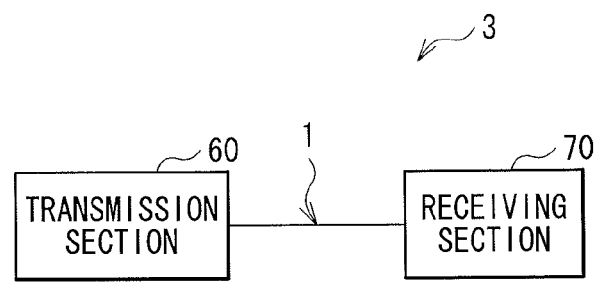

FIG. 21 illustrates a schematic configuration of an optical communication system 3. In the optical communication system 3, for example, an optical signal outputted from a transmission section 60 including a laser diode and the like enters the connector 1, and propagates through the optical fiber (the optical fiber 40 in FIG. 11). The light after propagating through the optical fiber may enter, for example, into a receiving section 70 including a photodiode and the like. Any of the connectors 1A, 1B, 2, and 2A may be used in place of the connector 1.

Figure 22:
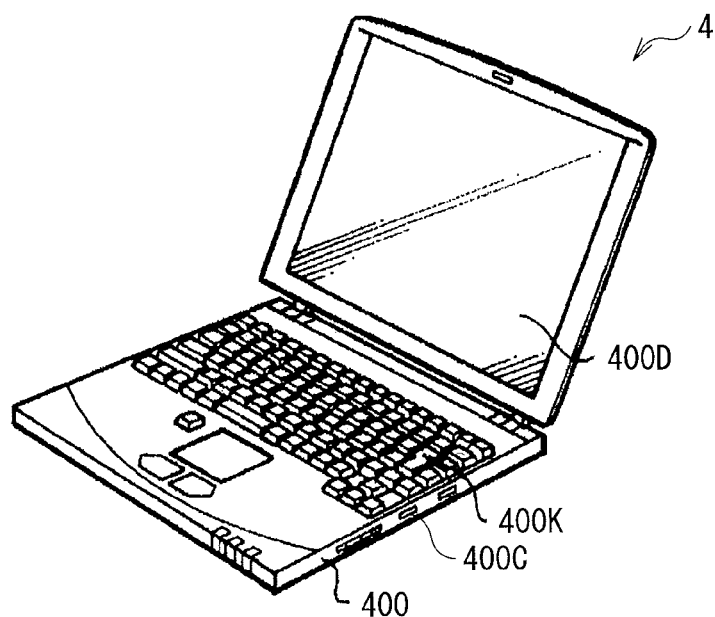
FIG. 22 is a perspective diagram illustrating an application example of the optical communication system illustrated in FIG. 21.

The optical communication system 3 may be, for example, incorporated in a SOC (System On Chip), and mounted on an electronic apparatus 4 such as a laptop computer (FIG. 22). The electronic apparatus 4 may include, for example, a main body section 400, a keyboard 400K used for operation of entering letters and the like, a display section 400D displaying an image, and a connector section 400C. The optical communication system 3 may be provided, for example, in the main body section 400.

The electronic apparatus 4 and, for example, other electronic apparatus such as a portable telephone may be connected by the optical communication system 3. In this case, the connector 1 is attached to, for example, the connector section 400C of the electronic apparatus 4.

EXAMPLES

Specific experimental examples of the technology will be described below.

Experimental Example 1

A connector to which twelve optical fibers were attached was produced, and positional accuracy of the optical fiber was measured by changing a width (about 2.94 mm to about 3.06 mm) and a height (about 215 μm to about 255 μm) of a fiber attachment path. For a supporting member and a cover member, PPS resin containing a filler was used. An overlayer and a core wire of the optical fiber were configured using UV-curable resin and quartz glass, respectively. The core wire was assumed to have a diameter of about 80 μm, and the optical fiber was assumed to have a diameter of about 250 μm including the overlayer. EPI-TEK 353ND (registered trademark, available from Epoxy Technology, Inc., located in MA, United Sates) was used for an adhesive provided to fix the optical fiber to the fiber attachment path.

Experimental Example 2

Aluminum was used for a supporting member and a cover member. Otherwise, in a manner similar to the experimental example 1, a connector was produced, and positional accuracy of an optical fiber was measured by changing a width (about 2.94 mm to about 3.06 mm) and a height (about 230 μm to about 265 μm) of a fiber attachment path.

The positional accuracy of the optical fiber was determined by measuring how far a core of each of twelve optical fibers (No. 1 to No. 12) deviated from a position where the core was supposed to be present in design. Localization of the optical fiber was performed using an image measuring machine. Table 1 indicates deviations in the X direction and the Z direction (i.e. d(X) and d(Z)), of each of No. 1 to No. 12 of the experimental example 2, when the width and the height of the fiber attachment path were assumed to be about 3.000 mm and about 250 μm, respectively. The deviation d(XZ) was determined by an expression (1). In this way, the deviation of the position of the optical fiber in each width and each height of the fiber attachment path was measured.

[Expression 1]

$$d(XZ)=\sqrt{d(X)^2+d(Z)^2} \qquad (1)$$

Figure 23A:
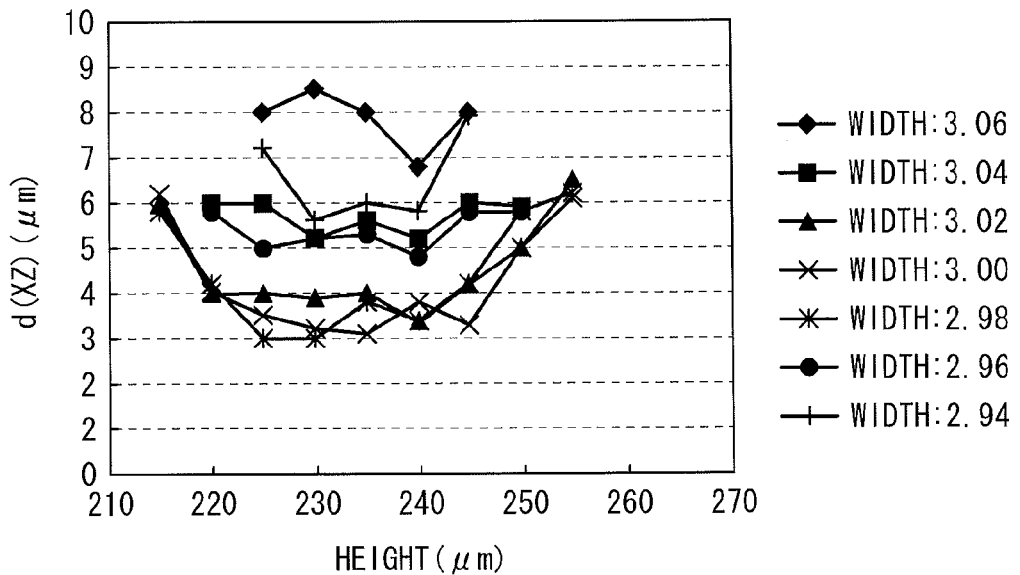
FIG. 23A is a diagram illustrating an example of misalignment of an optical fiber based on a height and a width of a fiber attachment path.
Figure 23B:
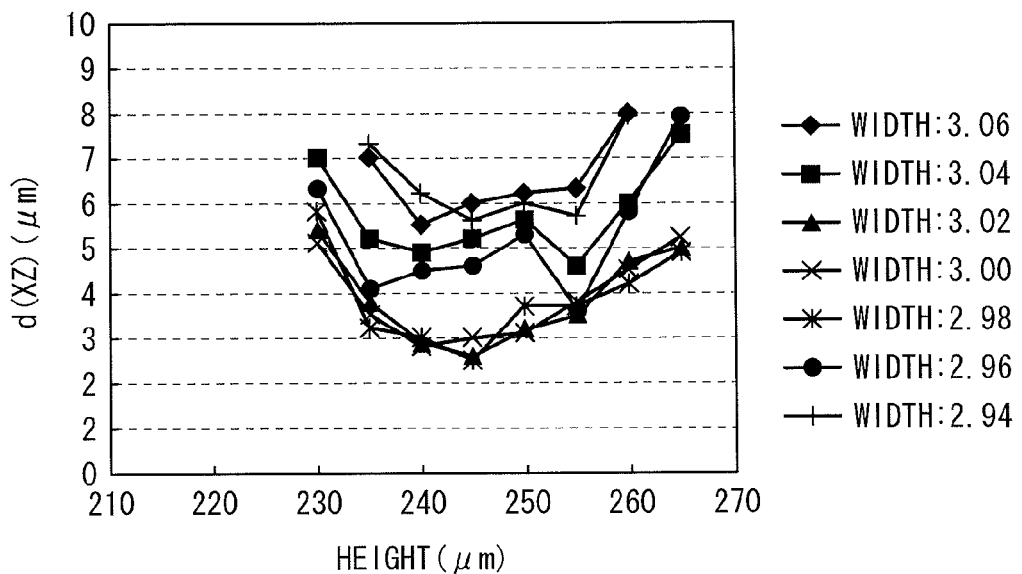
FIG. 23B is a diagram illustrating another example of the misalignment of the optical fiber based on the height and the width of the fiber attachment path illustrated in FIG. 23A.

FIGS. 23A and 23B illustrate results of the experimental example 1 and results of the experimental example 2, respectively. FIGS. 23A and 23B each illustrate a relationship between the height of the fiber attachment path and the deviation d(XZ), in each width of the fiber attachment path. In both of the experimental examples 1 and 2, the deviation became smaller, as the width of the fiber attachment path approached about 3.000 mm that is the sum of the diameters of the respective twelve optical fibers. As for the height of the fiber attachment path, the deviation was small in a range in which the height was about 220 μm or more to about less than 250 μm, in the experimental example 1 using the resin for the supporting member and the cover member. In the experimental example 2 using the metal for the supporting member and the cover member, the deviation was small in a range in which the height was about 235 μm or more to about less than 250 μm. When the width of the fiber attachment path was assumed to be about 2.96 mm to about 3.04 mm, an absolute error was allowed to be suppressed to about 6 μm or less in the height falling within the above-described ranges. In this way, an optimum height of the fiber attachment path to suppress misalignment of the optical fiber varies depending on the rigidity of the supporting member and the cover member.

As described above, the technology has been described with reference to the example embodiments and some modifications, but is not limited thereto and may be variously modified. For example, in the above-described embodiments, the case in which the moisture-proof film 33 (FIG. 16) or the optical fiber 40A is provided in the connector 1 has been described, but the moisture-proof film 33 or the optical fiber 40A may be provided in any of the connectors 2 and 2A. Alternatively, both the moisture-proof film 33 and the optical fiber 40A may be provided in the connector 1 or any of the connectors 2 and 2A.

Further, in each of the above-described embodiments and the like, the case in which the lens 14 is provided on the back-surface side of the supporting member 10 has been described, but the lens 14 may be omitted. Furthermore, the wide section 11A of the depression section 11 may be omitted.

In addition, in each of the above-described embodiments and the like, the case in which the connector 1 or the like includes the plurality of optical fibers 40 has been described, but the optical fiber 40 may be provided as a single optical fiber in the connector 1 or the like.

Still further, the electronic apparatus 4 may be any type of electronic apparatus, for example, such as a display, other than a laptop computer.

Moreover, the materials and thicknesses, or the film formation methods and film formation conditions described in the above-described embodiments and the like are illustrative

TABLE 1

| | No. 12 | No. 11 | No. 10 | No. 9 | No. 8 | No. 7 | No. 6 | No. 5 | No. 4 | No. 3 | No. 2 | No. 1 | Average | d(XZ) (μm) |
|---|---|---|---|---|---|---|---|---|---|---|---|---|---|---|
| d(X) (μm) | 3 | 3.3 | 4 | 4.5 | 4.4 | 3.5 | 2.8 | 2.5 | 2.2 | 2 | 2.2 | 3.2 | 3.13 | 3.1 |
| d(Z) (μm) | −0.1 | −0.2 | −0.1 | −0.2 | −0.3 | −0.2 | 0 | 0.1 | 0.2 | 0.2 | 0.1 | 0.1 | 0.15 | | and not limitative. Other materials and thicknesses, or other film formation methods and film formation conditions may be adopted.

It is possible to achieve at least the following configurations from the above-described example embodiments of the disclosure.

(1) A connector including:
a fiber attachment path in which at least a part thereof has a height less than an outer diameter of an optical fiber; and
a light-direction changing section provided at an end of the fiber attachment path.

(2) The connector according to (1), including the optical fiber optically connected to the light-direction changing section and flattened by the fiber attachment path.

(3) The connector according to (2), wherein
the fiber attachment path is configured using a depression section and a cover member, the depression section being provided on a surface of a supporting member, and the cover member covering the depression section, and
the light-direction changing section changes a direction of light entering from the optical fiber side into a direction toward a back surface of the supporting member, and changes a direction of light entering from the back-surface side of the supporting member into an extending direction of the optical fiber.

(4) The connector according to (2) or (3), wherein the optical fiber includes a core wire and an overlayer covering the core wire, and the overlayer is flattened.

(5) The connector according to (3), wherein the light-direction changing section changes the direction of the incident light, by using a reflection section provided in the depression section.

(6) The connector according to (5), wherein
the depression section includes a protruding section, and
the optical fiber is in contact with one surface of the protruding section, and other surface of the protruding section forms the reflection section.

(7) The connector according to (6), wherein
the protruding section is in contact with the cover member, and
in the depression section, a first adhesive used to fix the optical fiber fills on the one surface side of the protruding section, and a sealing section closed by the cover member is provided on the other surface side of the protruding section.

(8) The connector according to (7), wherein the cover member has an injection hole for the first adhesive.

(9) The connector according to (7), wherein the depression section includes an injection section wider than the cover member and provided for the first adhesive.

(10) The connector according to any one of (7) to (9), wherein
the first adhesive is made of a UV-curable resin, and
a part of one or both of the supporting member and the cover member is made of a UV light transmission material.

(11) The connector according to (3) or any one of (5) to (10), wherein the height of the fiber attachment path is gradually reduced from an open end to the light-direction changing section, and reaches the height less than the outer diameter of the optical fiber at a predetermined position.

(12) The connector according to (11), wherein the supporting member and the cover member have respective surfaces facing each other, one or both of the surfaces being tapered.

(13) The connector according to any one of (2) to (12), wherein the fiber attachment path includes a plurality of optical fibers each equivalent to the optical fiber.

(14) The connector according to (13), wherein in at least a part of the fiber attachment path, a width of the fiber attachment path is equal to a sum of outer diameters of the respective plurality of optical fibers.

(15) The connector according to (14), wherein the width of the fiber attachment path is gradually narrowed from an open end to the light-direction changing section, and reaches the sum of the outer diameters of the respective plurality of optical fibers at a predetermined position.

(16) The connector according to (3) or any one of (5) to (12), wherein the cover member includes a holding section protruding from the supporting member.

(17) The connector according to (16), wherein the optical fiber is fixed to the holding section by a second adhesive.

(18) The connector according to (3) or any one of (5) to (12), further including a lens at a position facing the light-direction changing section, the position being on the back surface of the supporting member.

(19) An optical communication system, including a connector performing optical communication between a receiving section and a transmission section, the connector including:
a fiber attachment path in which at least a part thereof has a height less than an outer diameter of an optical fiber; and
a light-direction changing section provided at an end of the fiber attachment path.

(20) A method of manufacturing a connector, the method including:
placing an optical fiber in a depression section of a supporting member having the depression section on a surface; and
covering, with a cover member, the depression section in which the optical fiber is placed, and fixing the optical fiber in the fiber attachment path configured using the depression section and the cover member, after flattening the optical fiber.

The disclosure contains subject matter related to that disclosed in Japanese Priority Patent Application JP 2012-194258 filed in the Japan Patent Office on Sep. 4, 2012, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. A connector for optically connecting an optical fiber, the connector comprising:
a fiber attachment path in which at least a part thereof has a height less than an outer diameter of the optical fiber; and
a light-direction changing section provided at an end of the fiber attachment path,
wherein the fiber attachment path is configured using a depression section, the depression section including a protruding section, wherein the protruding section is disposed inside the depression section, and wherein a surface of the protruding section forms the light-direction changing section,
wherein the optical fiber includes a core wire and an overlayer covering the core wire, and the fiber attachment path is configured to flatten the overlayer of the optical fiber.

2. The connector for optically connecting the optical fiber according to claim 1, wherein the optical fiber is optically connected to the light-direction changing section and the overlayer of the optical fiber is flattened to fix in the fiber attachment path.

3. The connector for optically connecting the optical fiber according to claim 1,
wherein the fiber attachment path is configured using a cover member and a supporting member, and the depression section is provided on a surface of the supporting member, and the cover member covers the depression section, and
the light-direction changing section changes a direction of light entering from the optical fiber side into a direction toward a back surface of the supporting member, and changes the direction of light entering from the back surface of the supporting member into an extending direction of the optical fiber.

4. The connector for optically connecting the optical fiber according to claim 1, wherein the light-direction changing section changes the direction of incident light, by using a reflection section provided in the depression section.

5. The connector for optically connecting the optical fiber according to claim 4, wherein the optical fiber is in contact with one surface of the protruding section, and other surface of the protruding section forms the reflection section.

6. The connector for optically connecting the optical fiber according to claim 5, wherein the protruding section is in contact with a cover member, and in the depression section, an adhesive used to fix the optical fiber is filled on the one surface side of the protruding section, and a sealing section closed by the cover member is provided on the other surface side of the protruding section.

7. The connector for optically connecting the optical fiber according to claim 6, wherein the cover member has an injection hole for the first adhesive.

8. The connector for optically connecting the optical fiber according to claim 6, wherein the depression section includes an injection section wider than the cover member and provided for the adhesive.

9. The connector for optically connecting the optical fiber according to claim 6, wherein the adhesive is made of a UV-curable resin, and a part of one or both of the supporting member and the cover member is made of a UV light transmission material.

10. The connector for optically connecting the optical fiber according to claim 1, wherein the height of the fiber attachment path is reduced from an open end to the light-direction changing section, and reaches the height less than the outer diameter of the optical fiber at a predetermined position.

11. The connector for optically connecting the optical fiber according to claim 1, wherein the fiber attachment path is configured using a cover member and a supporting member, and the supporting member and the cover member have respective surfaces facing each other, one or both of the surfaces being tapered.

12. The connector for optically connecting the optical fiber according to claim 1, wherein the fiber attachment path includes a plurality of optical fibers.

13. The connector for optically connecting the optical fiber according to claim 12, wherein a width of the fiber attachment path at a predetermined position is equal to a sum of outer diameters of the respective plurality of optical fibers.

14. The connector for optically connecting the optical fiber according to claim 13, wherein the width of the fiber attachment path is narrowed from an open end to the light-direction changing section, and reaches the sum of the outer diameters of the respective plurality of optical fibers at the predetermined position.

15. The connector for optically connecting the optical fiber according to claim 1, wherein the optical fiber is fixed to a holding section by an adhesive.

16. The connector for optically connecting the optical fiber according to claim 1, further comprising a lens at a position facing the light-direction changing section, wherein the fiber attachment path is configured using a cover member and a supporting member, and the position is on a back surface of the supporting member.

17. An optical communication system, including a connector performing optical communication between a receiving section and a transmission section, the connector for optically connecting an optical fiber, the connector comprising:
a fiber attachment path in which at least a part thereof has a height less than an outer diameter of the optical fiber; and
a light-direction changing section provided at an end of the fiber attachment path,
wherein the fiber attachment path is configured using a depression section and the depression section includes a protruding section, wherein the protruding section is disposed inside the depression section, and wherein a surface of the protruding section forms the light-direction changing section,
wherein the optical fiber includes a core wire and an overlayer covering the core wire, and the fiber attachment path is configured to flatten the overlayer of the optical fiber.

18. A connector for optically connecting an optical fiber, the connector comprising:
a fiber attachment path in which at least a part thereof has a height less than an outer diameter of the optical fiber; and
a light-direction changing section provided at an end of the fiber attachment path,
wherein the fiber attachment path is configured using a depression section and the depression section includes a protruding section, wherein the protruding section is disposed inside the depression section, and wherein a surface of the protruding section forms the light-direction changing section, and
wherein the optical fiber includes a core wire and an overlayer covering the core wire, and the overlayer is flattened.

* * * * *